Sept. 25, 1934.                G. H. STADE                1,975,025
COMBINATION WRENCH
Filed Sept. 1, 1932
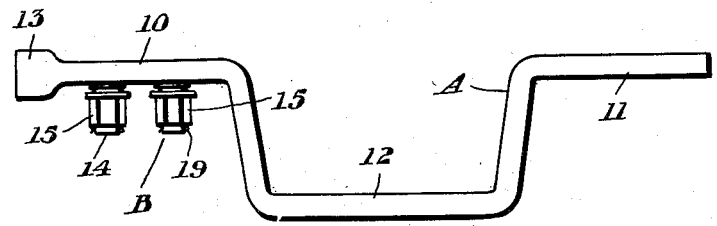
Fig. 1.
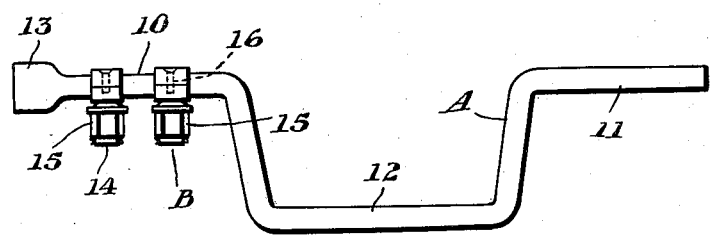
Fig. 2.
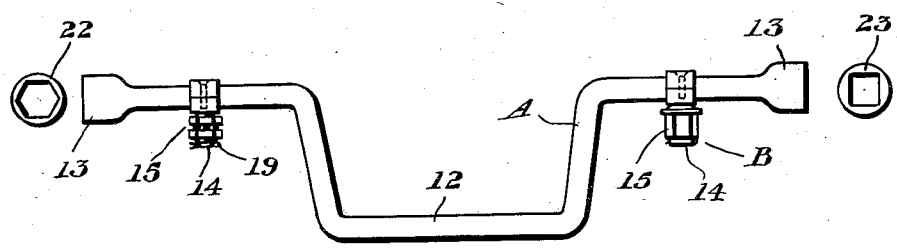
Fig. 3.
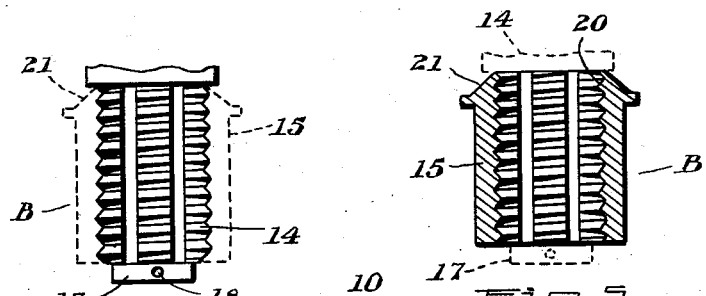
Fig. 4.        Fig. 5.
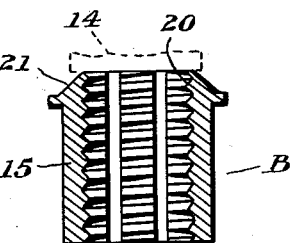
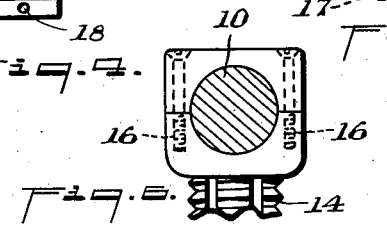
Fig. 6.
INVENTOR.
GEORGE. H. STADE.
BY  J. Howard Klein
ATTORNEY.

Patented Sept. 25, 1934

1,975,025

UNITED STATES PATENT OFFICE 1,975,025

COMBINATION WRENCH

George Henry Stade, Victoria, British Columbia, Canada

Application September 1, 1932, Serial No. 631,387
In Canada August 20, 1932

3 Claims. (Cl. 7—1)

This invention relates to combination wrenches and has more particular reference to what is termed a rim wrench employed principally for the purpose of removing and replacing nuts on demountable automobile wheels.

As is well known in the field of motor vehicles, the wheels with tires attached are detachably connected thereto by means of bolts or studs and nuts, and it is also well known that from time to time blowouts, etc., occur in the tires which makes it necessary to remove the wheels for tire repair or replacement and this most frequently occurs in out-of-the-way and inconvenient places. The removal of the wheel under these circumstances, especially heavy truck wheels, invariably damages the thread of the holding studs or bolts both during the removal and replacement, and after the repair of the tire has been effected and the wheel replaced, it is most difficult, if not impossible, to again thread the nut on the bolt or stud due to its damaged condition, and unless the operator of the vehicle is close to a machine shop or carries a complete outfit for remedying the difficulty, no end of trouble ensues.

In order to meet situations such as have been set forth, and also to eliminate the necessity of carrying the full equipment to readily meet such trouble, I provide a rim wrench having connected thereto at least one die and tap member. The tap member preferably is permanently connected to the wrench while the die member is detachable.

In carrying a combination tool such as I have developed, the wrench itself acts as a holder or support in the light of a bench vice and when placed on an unloosened rim nut or the like enables the operator to readily re-thread a nut on the tap. Thus emergencies in out-of-the-way places can be met efficiently and economically by merely removing the die member and re-threading the nut or placing the die in the wrench and re-threading the stud or bolt. In this manner repair is readily effected with a minimum loss of time.

One of the objects of the invention, therefore, is to provide a device of this character which includes means for re-threading the bolts or studs and nuts of detachable automobile wheels.

Another object of the invention is to so combine the repair elements that the thread portions thereof are protected and at the same time so mounted that they are always associated with the wrench.

A further object of the invention is to provide bolt and nut re-threading units which may be attached to wrenches now in use.

A still further object of the invention is to provide a wrench of this character in which the wrench and associated parts may be combined in the one tool.

Having regard to the foregoing and other objects and advantages which will become apparent as the description proceeds, the invention consists essentially in the novel combination and arrangement of parts hereinafter described in detail and illustrated in the accompanying drawing in which:

Figure 1 is a view of an ordinary rim wrench illustrating the tap and die arrangement associated therewith.

Figure 2 is a view similar to Figure 1 illustrating a detachable method of connecting the tap and die members to the wrench.

Figure 3 is an illustration of my improved wrench adapted for what is commercially known as "Budd" wheels wherein dual rim nuts of different sizes and threads are employed.

Figure 4 is a view of the tap member in detached form, the die member being shown in dotted lines.

Figure 5 is a sectional view of the die member detached showing the tap member in dotted lines, and, Figure 6 is a detail of the head structure of a tap for connection with a wrench already in use.

Referring now to the detail of my combination wrench wherein like letters and numerals of reference indicate corresponding parts in the various views, the letter A designates the wrench as a whole and the letter B the associated tap and die means.

The wrench itself is well known in the art, and may take any convenient form. In the present instance I have illustrated such wrench as comprising shank 10, hand grip 11, operating portion 12, and socket 13.

Coming now to the essential feature of the invention this comprises tap members 14 and dies 15. The method of attaching the taps to the shank 10 may take many different forms, welding, for example, is very practical. On the other hand the shank 10 may be partly reamed and a stub portion of the die extended thereinto and be secured therein by means of a pin or the like or, as more particularly illustrated in Figure 2, the end of the die may be in split collar form with head piece and cap and embrace the shank and be secured thereon by means of screws or the like 16. In the present instance I have shown the tap members as mounted in an out-of-the-way position on the shank 10, however it will be understood that other appropriate parts of the wrench could be used for attaching purposes.

Ordinarily, only one tap and die would be required, but, should it be found necessary, a second set could be mounted on the wrench; such sets, for example, may include right and left hand threads.

As observed particularly in Figures 4 and 5, the tap is provided with a projecting portion 17, which extends below the normal length of the die and is provided with an orifice 18 which is adapted to accommodate a cotter pin 19 or like securing means. By providing combination securing means of this character the tap and die members will always be associated with the wrench and at the same time the cutting threads thereof will be carefully protected.

The die member herein illustrated is of the usual hexagonal external formation, and is provided with interior cutting threads 20. One extremity of the die, it will be observed, is of tapered or cone-shaped formation, as indicated at 21, so that the thread of the stud or bolt may be cut to its full extent. Such provision is necessary where the portion of the wheel, usually disc wheel, is counter-sunk and the studs are located in the counter-sunk portion of the disc.

In the form illustrated in Figure 3 the wrench is provided more especially for use in connection with rim nuts on what is commercially known as "Budd" wheels which employ dual nuts, one square and one hexagonal and the one threadedly engaging the other. Such provision includes sockets 22 and 23 of hexagonal and square formation respectively and tap and die members to accommodate the different threads.

In operation, and assuming that the threads of the bolts or studs have been damaged when the wheel has been removed and replaced, the cotter pin or the like is first removed, the die unscrewed and then placed in the socket 13. The wrench is then gripped in the usual manner and the thread of the bolt or stud quickly re-cut. In the event that the thread of the nut is damaged the wrench is positioned as previously mentioned, then the nut is placed on the tap and threaded thereon by an ordinary wrench. Upon completion of the thread cutting operation the die is replaced on the tap and the securing means such as a cotter pin again inserted, thus the combination of elements in unitary form are always together and ready for use.

Many changes could be made in the above and many apparently widely different embodiments of the invention constructed without departing from the spirit or scope of the invention. It will be understood, therefore, that all matter contained herein shall be interpreted as illustrative and not in a limitative sense.

What I claim as my invention is:

1. In a combination tool for removing and replacing nuts of wheel bolts and rethreading the said nuts and bolts, an operating wrench having a socket, a tap member formed with a head piece secured to said operating wrench and supported thereby, and a die member detachably connected to and supported by the tap member, the said die member having an external configuration to correspond to the internal configuration of said socket so that the die may be operable for thread cutting purposes by said operating wrench.

2. A combination tool for removing and replacing nuts of wheel bolts and rethreading the said nuts and bolts comprising, a wrench member provided with operating means and at least one die and nut receiving socket, a die member adapted to fit the said wrench socket, a tap member secured to the wrench member and means associated with the tap member for retaining the die thereon, the said wrench member forming a support for the tap member and a holder and operating means for the die member.

3. In a combination tool for rethreading the threads of nuts and bolts of wheel bolts, a tap member, a head piece for the tap member, a die member detachably held on the tap member and an extension piece for the tap member provided with a securing member to retain the die thereon and prevent the said die from normally becoming detached from the tap member.

GEORGE HENRY STADE.